United States Patent
Kassarjian

[11] 3,732,078
[45] May 8, 1973

[54] FLOW REDISTRIBUTOR FOR A FIXED BED DOWN FLOW REACTOR

[75] Inventor: John R. Kassarjian, Detroit, Mich.

[73] Assignee: Marathon Oil Company, Findlay, Ohio

[22] Filed: Apr. 16, 1971

[21] Appl. No.: 134,776

[52] U.S. Cl. ..............23/288 R, 23/283, 23/285, 208/213, 210/285, 210/290
[51] Int. Cl. ..............B01j 9/04
[58] Field of Search ...........23/288 R, 285, 283, 23/289; 208/213, 214; 210/284, 285, 290

[56] References Cited

UNITED STATES PATENTS

| 2,006,078 | 6/1935 | Pyzel | 23/288 R |
| 2,202,800 | 5/1940 | Rieweg | 23/283 X |
| 2,801,159 | 7/1957 | Carton et al. | 23/288 R X |
| 3,489,529 | 1/1970 | Dudych et al. | 23/288 R X |
| 3,498,755 | 3/1970 | Borre | 23/288 R |
| 3,592,613 | 7/1971 | Boyd | 23/288 R |
| 3,598,541 | 8/1971 | Hennemuth et al | 23/288 R |
| 3,607,000 | 9/1971 | Beal et al. | 23/288 R X |
| 3,112,256 | 11/1963 | Young et al. | 23/288 R X |

Primary Examiner—Barry S. Richman
Attorney—Joseph C. Herring, Richard C. Willson, Jr. and Jack L. Hummel

[57] ABSTRACT

In a fixed bed down flow reactor, e.g., a gas-oil hydrotreater, there is installed a deflector, e.g., a 6-inch wide rim around the inside perimeter of the reactor and a load of low flow resistance particles, e.g., balls, is loaded immediately below the rim so that channeling is redistributed.

7 Claims, 5 Drawing Figures

PATENTED MAY 8 1973 3,732,078

$$TCF = [1.8-(T-670)(0.0133)]$$
$$RCF = (FEED\ RATE/14,000\ b/d)^{0.4682}$$

*INVENTOR*
JOHN R. KASSARJIAN

WITNESSES
Patricia E. Jeffryes
Mary Elizabeth Henry

BY
ATTORNEY

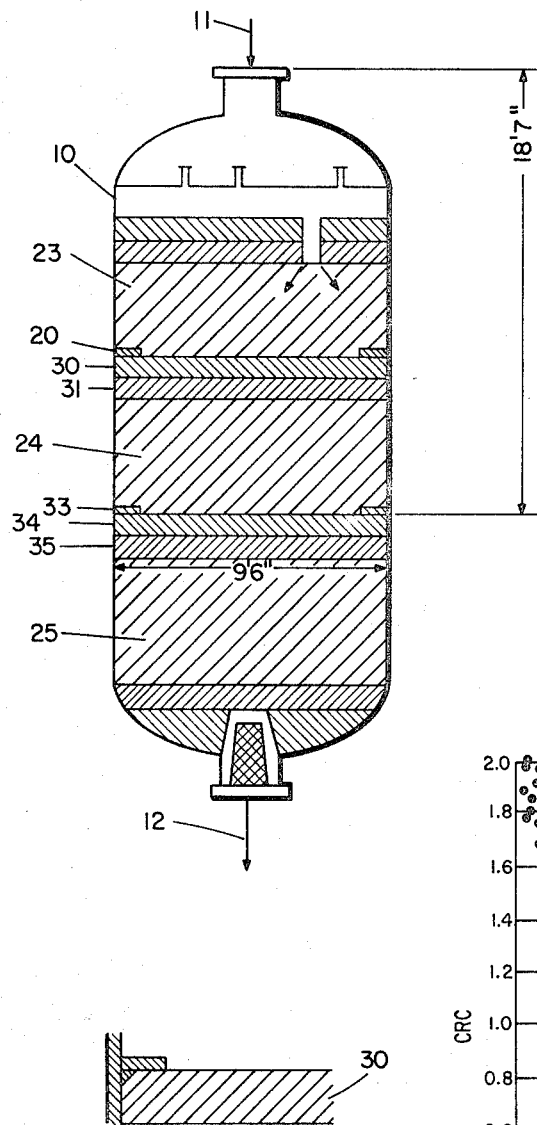
Fig. 3
Fig. 3a
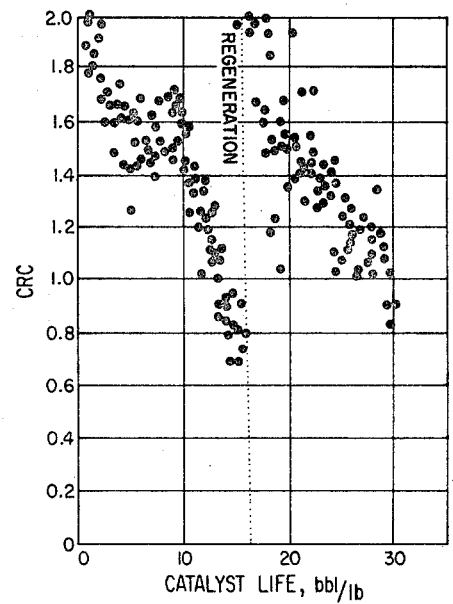
Fig. 4
INVENTOR
JOHN R. KASSARJIAN

3,732,078

FLOW REDISTRIBUTOR FOR A FIXED BED DOWN FLOW REACTOR

BACKGROUND OF THE INVENTION

1. Field of the Invention

The present invention relates generally to the field of fluid-solid contact reactors generally classified in the United States Patent Office Class 23, subclass 288, particularly examiner's subclass 288 R.

2. Description of the Prior Art

Various down-flow reactors have been described in U.S. Pats., including: Nos. 2,292,716, 2,893,852 which shows a layered bed used for reducing catalysts bed displacement, No. 3,100,141 which shows a layer of inert material across the top of the fixed bed reactor, No. 3,218,249 which shows a bubble-cap distributor layer and a layer of inert pellets across the top of a fixed reactor bed, No. 3,255,159 which shows a grating-type distributor across the top of a fixed bed.

None of the above patents appear to achieve the sharply increased efficiency and reduction in channeling which are achieved by the present invention without significant increase in pressure drop through the reactor.

SUMMARY OF THE INVENTION

General Statement of the Invention

According to the present invention there is placed within the bed a ring or similar deflector which is substantially perpendicular to the interior surface of the reactor and which is in substantially fluid-tight contact with the interior surface of the reactor at substantially continuously around the periphery of the interior surface. Beneath this ring is placed a layer of larger-sized solid particles. It has been found that this combination of deflector ring plus larger-sized particles increases the efficiency of the reactor, e.g., in hydrotreating or other hydrocarbon conversion processes. Because the deflector need cause only a minor constriction of the area open to flow and because the constriction is over only a very small portion of the total vertical length of the reactor, the pressure drop through the reactor is not greatly increased by the use of the present invention. This is in contrast to the pressure drop caused by the bubble-cap type of prior art patents mentioned above. Further, the deflector of the present invention offers easy accessibility to the catalyst bed for maintenance or for changing the bed. Because the deflector-layer of larger-sized solids is located within the bed rather than at the top of it, channelling is sharply reduced. Of course, the present invention can be employed with the conventional types of distributors. Also, on reactors having particularly high vertical length, it will be preferable to employ a plurality of the distributor-layer arrangements of the invention spaced apart along the vertical dimension of the reactor bed.

UTILITY OF THE INVENTION

The present invention can be utilized with vertical reactors in general including, for example, hydrocarbon conversion reactors, e.g., hydrotreaters (hydrodesulfurization), hydrocrackers, driers, catalytic reformers (downflow), filters (i.e., clay, charcoal); ion exchange towers, e.g., water softeners of the zeolitic type, essentially any fixed bed/fluid downflow process.

DESCRIPTION OF THE DRAWINGS

FIG. 3 is a vertical section view of a reactor according to the present invention.

FIG. 3a is a detail showing the horizontal deflector plate and packed bed of the reactor of FIG. 3.

FIG. 4 is a plot of the performance of the reactor of FIG. 3.

DESCRIPTION OF THE PREFERRED EMBODIMENTS

Figure 1:
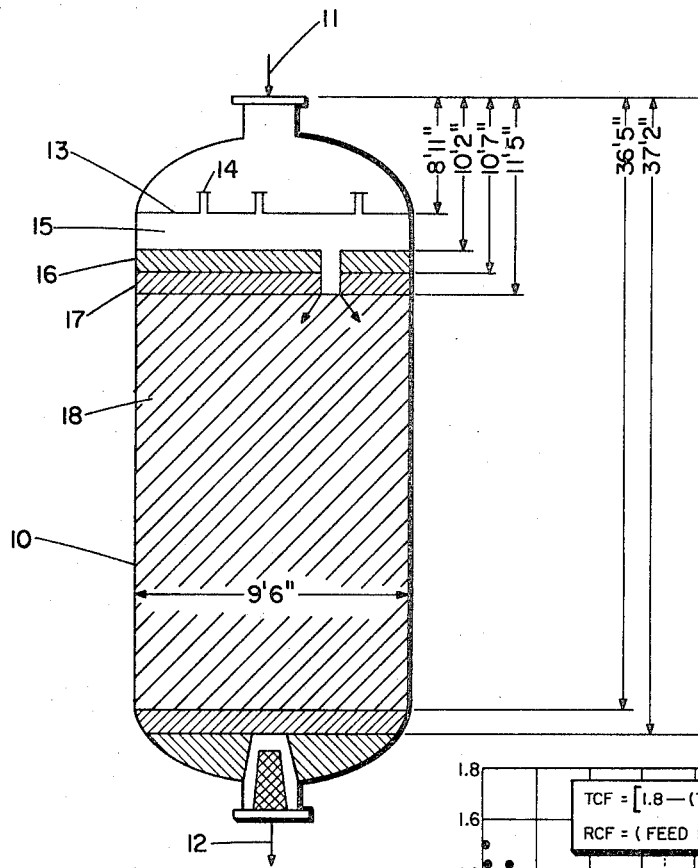
FIG. 1 is a vertical section view of a reactor according to the prior art.

Reactor: The shape of the reactor employed with the present invention is not narrowly critical but will generally be a vertical fixed bed reactor, most preferably of circular horizontal crossection. While the invention may be employed with beds of any depth so long as they are sufficient to contain the deflector and layer of the present invention, its use will be particularly preferred for beds of substantial depth in which the effective channelling is generally more severe. Similarly, the diameter of the reactor is not narrowly critical.

Deflector: The outer periphery of the deflector will conform to the inner shape of the reactor. The preferred outer periphery of the deflector will be circular to conform to the preferred cylindrical reactor. The interior periphery of the deflector will preferably also be circular so that the deflector is an annular ring. However, in particular circumstances the interior periphery of the deflector may be square or star-shaped or pinked. In general, the deflector will be welded to the interior wall of the reactor with hangers and supports as necessary to provide suitable mechanical strength. The deflector will generally project from about 0.02 diameter to about 0.25 diameter, more preferably from 0.04 diameter to about 0.10 diameter, and most preferably from 0.06 diameter to about 0.10 diameter inches inward from the interior wall of the reactor.

While the deflector will generally be positioned transverse to the direction of flow, the upper surface of the deflector may be sloped to avoid hold-up of catalyst when the fixed bed is dumped periodically to replenish the catalyst.

The layer of large-sized solid particles: The preferred shape of the large solid particles is spherical although other shapes, e.g., raschig rings, berl saddles, extrudates and other conventional catalyst or contact material shapes may be employed.

Preferably the layer of larger sized solid particles will be composed of particles having a major dimension of from about 2× to about 40×, more preferably from about 5× to about 30×, and most preferably from about 10× to about 20×. ("20×" means 20 times the size of the catalyst particle or sphere.) Spheres and extrudate (cylinders) will be especially preferred.

While not narrowly critical, the catalyst will generally have a major dimension of from about one one-hundredth to about 1.5 inches, more preferably from one thirty-second to about one-half inch. Accordingly, the layer of larger size solid particles will preferably be composed of particles having major diameter of from about one-fiftieth to about 4 inches, more preferably from about one-sixteenth to about 2 inches and most preferably from one-sixteenth to about 1 inch.

Where the catalyst in the active portion of the fixed bed is sufficiently small to migrate into the openings between the larger particles, a layer of intermediate sized particles (which may be either catalyst or inert material) will be located above the layer of larger particles to screen out catalysts which might otherwise move down and clog the porosity of the layer of larger particles.

Bed depth: While not narrowly critical, the height of the layer of larger particles will in general be in the range of from about 6 to about 50, more preferably from about 12 to about 30, and most preferably from about 18 to about 24 inches. Where a layer of intermediate sized particles it utilized to screen out catalyst migration into the spaces between the larger particles, the intermediate particle bed thickness will also preferably be within the above mentioned ranges.

Where the reactor is sufficiently high that more than one of the deflectors and layers of large particles of the invention are to be employed, the distance between the deflectors will in general be in the range of from about 0.1 Bed Height (BH) to about 0.5 BH, more preferably from about 0.15 BH to about 0.4 BH, and most preferably from 0.2 BH to about 0.3 BH.

The bed of larger particles will in general be located directly beneath the deflector. Where a layer of intermediate-sized particles is employed, that layer will preferably be located immediately below the deflector with the bed of larger-sized particles immediately below the intermediate-sized particles.

Composition of the larger (and intermediate)-sized particles can be either inert material, e.g., stoneware, lundum, alumina, glass, metals, etc. or can be catalytic, e.g., metals, metal salts impregnated onto a support of inert material.

Example I: (Prior art) A reactor 10 receives a mixture of gas-oil and hydrogen as a stream 11 from a desulfurization unit-heater in a conventional refinery. The purpose of the reactor is to contact the stream 11 with desulfurization catalyst to produce a product stream 12 which is substantially reduced in sulfur. The stream 11 first contacts a distribution tray 13 having bubble caps 14, then encounters a void 15, then a layer 16 composed of a 7 inch thick bed of 1 inch diameter inert balls. The stream next encounters layer 17 which is a bed approximately 8 inch thick composed of ¼ inch diameter inert balls. Distributor baskets approximately 4 inches diameter and made of 8 to 10 mesh screen extend downward through both bed 16 and 17. Beneath bed 17 is a layer 18 of desulfurization catalyst sold by American Cyanamid Company under the tradename "HDS–3bA" and containing $NiO$—$MoO_3$ as the active ingredient. The catalyst is approximately 1/16 inch diameter by ¼ inch long extrudate. The stream flows downward through this bed of catalyst with the usual difficulties in channelling along the sides of the reactor and in the center of the reactor. This channelling causes uneven life of the catalyst and provides a lower effective contact surface for the promotion of the reaction.

Figure 2:
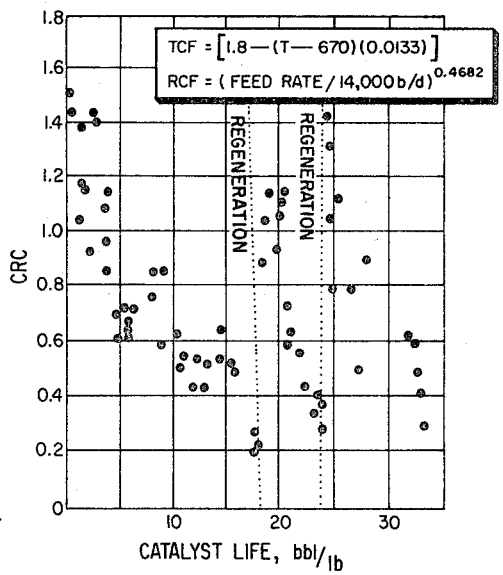
FIG. 2 is a plot of the performance of the reactor of FIG. 1.

FIG. 2 shows first order kinetic data on the catalyst life in barrels of hydrocarbon processed per pound of catalyst vs. catalytic reaction rate (CRC), a measure of the relative activity of the catalyst. Note that the CRC begins at about 1.5 and gradually decreases, reaching about 0.2 after about 17 barrels of hydrocarbon have been processed per pound of catalyst. At this point the bed is recharged by burning with an inert gas or steam with a low oxygen content. Recharging raises the activity to about 1.4 after which it gradually decreases to about 0.3 after 24 barrels (accumulative) of hydrocarbon have been processed per pound of catalyst. A second regeneration then raises the activity again to 1.4 after which it decreases to about 0.3 after 34 barrels (accumulative) of hydrocarbon have been processed per pound of catalyst.

Additional details of this desulfurization reaction can be obtained from applicant's article in the Jan. 18, 1971 Oil and Gas Journal, pp 69 through 71.

Example II: (According to the present invention): FIG. 3 shows an identical reactor 10 with an identical catalyst bed except that the catalyst bed is interrupted by two of the deflector-layer of larger particles according to the present invention. A deflector 20 is located about one-quarter of the way down through the catalyst bed 18. This deflector, shown in more detail in FIG. 3a consists of an annular ring of stainless steel alloy welded or tacked to the reactor in substantially gastight contact with the interior of the reactor. The deflector is an alloy ring 9 feet 6 inches O.D. by 8 feet 6 inches I.D. and one-eighth inch thick. Immediately beneath the ring is a 9 inch deep layer 30 of ¼ inch diameter spheres. The catalyst bed 23 rests on this guard layer 30. Immediately below the guard layer 30 is a 9 inch deep layer 31 of larger particles according to the present invention. These particles are 1 inch diameter spheres and they form a porous layer which has been found to reduce center channeling and to redistribute the fluids moving downward through the reactor. These large particles rest on a second bed 24 of catalyst identical with that used in Example I. About two-thirds of the way down the reactor is located a second deflector 33 identical with deflector 20, followed by a second guard layer 34 identical with guard layer 30 and a second layer of large particles 35, identical with layer 31. This is followed by a third layer of catalyst 25, identical with that used in Example I.

FIG. 4 shows the operation of the reactor of FIG. 3 in terms of CRC (catalyst activity) vs. barrels of hydrocarbon processed per barrel of catalyst. The activity of the catalyst is initially at 2.0 because of the better hydrocarbon/catalyst contact achieved by avoidance of channelling. After about 17 barrels of hydrocarbon have been processed per barrel of catalyst, the activity is approximately 0.7. Comparison of FIG. 4 with FIG. 2 shows that the activity with the invention starts higher and remains higher after processing identical quantities of hydrocarbon. Regeneration of the catalyst restores activity to about 2.0 and after 30 barrels of hydrocarbon per pound of catalyst have been processed, activity remains at approximately 0.8. The increased initial activity and the relatively high activity even after processing 17 barrels per pound of hydrocarbon indicates the advantages of the present invention. The catalyst in this Example II according to the present invention, is identical with that used in Example I. However, the absence of channelling offers maximum utilization of catalyst and prevents depletion of catalyst in areas within the reactor. Full utilization of catalyst life means higher average catalyst activity or, optionally, more barrels of hydrocarbon processed between catalyst regenerations.

Modifications of the Invention

It should be understood that the invention is capable of a variety of modifications and variations which will be made apparent to those skilled in the art by a reading of the specification and which are to be included within the spirit of the claims appended hereto.

What is claimed is:

1. In a fixed bed down-flow catalytic hydrotreater reactor having a fixed porous bed of material and having distributor means located near the upper end of said reactor for distributing down-flowing fluids over the cross-sectional surface of said fixed porous bed of material, the improvement consisting essentially of in combination:

a. at least one supplemental distributor means located within said porous bed of material, said supplemental distributor means consisting essentially of at least one substantially horizontal deflector means projecting inward from the walls of said reactor, said deflector means being in substantially fluid-tight contact with said walls of said reactor and projecting inward from said walls for a distance equal to from about 2 to about 25 percent of the cross-sectional dimension of said reactor, said deflector means being substantially continuous about all of the internal periphery of said reactor and said supplemental distributor means additionally comprising a substantially horizontal layer of solid particles having a larger diameter than the catalyst particles comprising the major portion of said fixed bed and being located below said horizontal deflector means.

2. Apparatus according to claim 1 wherein the reactor is a substantially vertical cylinder.

3. Apparatus according to claim 1 wherein the catalytic portion of the fixed bed comprises substantially spherical particles having a diameter within the range of from about one one-hundredth to about 2.0 inches.

4. Apparatus according to claim 1 wherein the layer of solid particles under said deflector comprises particles having major dimensions in the range of from about one-eighth to about 2 inches.

5. Apparatus according to claim 4 wherein the larger particles are spheres.

6. Apparatus according to claim 1 wherein the reactor is a vertical cylindrical vessel, wherein the deflector means projects from about 0.02 to about 0.25 diameters, wherein the deflector is positioned transverse to the direction of flow, wherein the larger-sized solid particles have a major dimension of from about 10 to about 20 times the size of the particles which compromise the catalytic portion of the fixed bed, wherein the layer of larger particles has a height in the range of from about 6 to about 50 inches, and wherein a plurality of said deflector means are present and the distance between deflectors is in the range of from about 0.1 to about 0.5 times the overall height of the total fixed bed within said reactor.

7. Apparatus according to claim 6 wherein the catalytic portion of the fixed bed comprises substantially spherical particles having a diameter within the range of from about one one-hundredth to about 2.0 inches.

* * * * *